Sept. 19, 1967     G. ALFIERI ET AL     3,342,503
DEVICE FOR RENDERING INDEPENDENT VEHICLE PNEUMATIC
SUSPENSIONS CONTROLLED BY LEVELLERS
Filed June 3, 1965

INVENTORS
Giuseppe Alfieri
Roberto Moriondo
By Stevens, Davis, Miller & Mosher
Attorneys United States Patent Office 3,342,503
Patented Sept. 19, 1967

3,342,503
DEVICE FOR RENDERING INDEPENDENT
VEHICLE PNEUMATIC SUSPENSIONS
CONTROLLED BY LEVELLERS
Giuseppe Alfieri and Roberto Moriondo, Milan, Italy, assignors to Fabbrica Italiana Magneti Marelli S.p.A., Milan, Italy, a corporation of Italy
Filed June 3, 1965, Ser. No. 461,007
Claims priority, application Italy, June 5, 1964, 47,983/64
6 Claims. (Cl. 280—6.1)

ABSTRACT OF THE DISCLOSURE

A servo actuatable leveller having a control means for opening a plurality of shut-off valves disposed in a passage between a plurality of pneumatic pressure responsive systems and a collecting chamber, the latter being adapted to be connected to a source of high pressure fluid and to a source of low pressure fluid. Means responsive to the actuation of the control means and to the height of a portion of the vehicle with respect to the wheels thereof are also provided for selectively connecting the chamber to one or the other above sources of fluid.

This invention relates to a device for rendering independent the elements relative to the pneumatic suspensions for vehicles, controlled by levellers which create in said suspensions a given pressure rate, depending on the load carried by the vehicle.

The advantages obtatined by using the vehicle pneumatic suspensions are known, and foremost of these are those that relate to the possibility of proportionating the spring action of said elements to the load carried by the vehicle. These suspensions are advantageously applied in vehicles such as cars and buses and their pressure is controlled by the leveller according to the load. At the desired time, the leveller provides—generally during the periods of rest of the vehicle—establishing each time the due pressure rate in the suspensions, by supplying or discharging into or from said suspension, compressed air when the load increases or decreases.

Known levellers satisfy the above requirements, but do not allow determined conditions to be obtained which are required while the vehicle is running. For example, when the vehicle takes a curve, or deflects from a rectilinear path, centrifugal forces arise which provoke as well the displacement of the load, causing overload on a part of the wheels of the vehicle and a reduced load on the other wheels.

These forces are not contrasted or neutralized by the vehicle pneumatic suspensions and said pneumatic suspensions are subjected to over-pressures or pressures not pertinent to the load on the vehicle. This is because the suspensions of a given wheel set are pneumatically connected to those of the other set of wheels, whereby the dynamic stresses which can occur during the running of the vehicle on a part of the wheels are not contrasted by the respective suspensions, and they therefore influence the remaining wheels and suspensions negatively.

This invention has the scope of obviating this drawback by establishing each time in every suspension or suspension set, a given pressure which, while the vehicle is running, is maintained constant and independent of the pressure in the adjacent suspensions for the wheels arranged on the other side of the vehicle. This occurs without the possibility of harmful displacements of compressed air between the various suspensions following the occurrence of dynamic actions or the like, generated by the running vehicle. In addition to this object, the present invention also relates to the construction of a device of the specified type that is easily applicable to the conventional pneumatic systems or to the conventional pneumatic suspensions so that it is operated automatically and depends on the operation of the leveller combined with said pneumatic suspensions.

Due to these further objections, this invention relates to a leveller embodying the device according to the invention which is constructed so that the leveller and the device mutually utilize their component parts to simplify their constructions, and, in addition, assure operation of the assembly constituted by the leveller and the device according to the invention.

In its essential inventive principle, the device comprises a shut-off valve set interposed between the leveller and the single pneumatic suspensions controlled by said leveller; control means to simultaneously actuate said shut-off valves and to connect both the suspension both to each other and to the leveller; and means to operatively connect the movable part of said leveller to the control means of the shut-off valve set so that when the leveller is actuated, the shut-off valve set is actuated as well to connect the pneumatic suspensions through the leveller to the compressed air source.

According to an advantageous embodiment the device, which is suitable to be incorporated in a leveller of a servo-actuatable type, comprises a piston which provides the sealing seat for the valve which can be operated by the hollow push rod of a leveller, said piston having at its periphery annular surfaces with which shaped heads cooperate, said heads being integral with the movable parts of the shut-off valve set and being arranged at the periphery of the cylinder in which said piston of the leveller slides, to reduce the number of the members of the leveller and of the device.

The invention will now be disclosed in the following description by making reference to the accompanying drawing which illustrates, by way of example, an advantageous embodiment of the device.

FIGURES 2 and 3 are partial cross-sections similar to FIGURE 1 of two modifications; while

Figure 1:
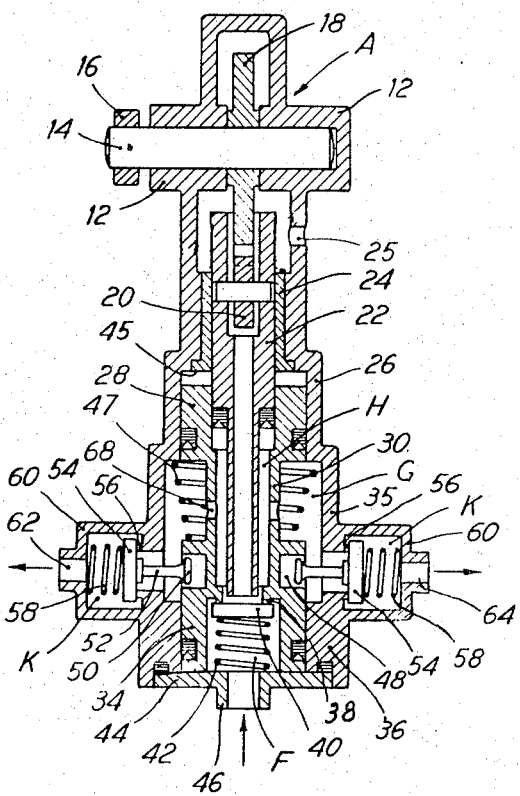
FIGURE 1, is a diagrammatic axial cross-section of a leveller embodying the device according to this invention.
Figure 4:
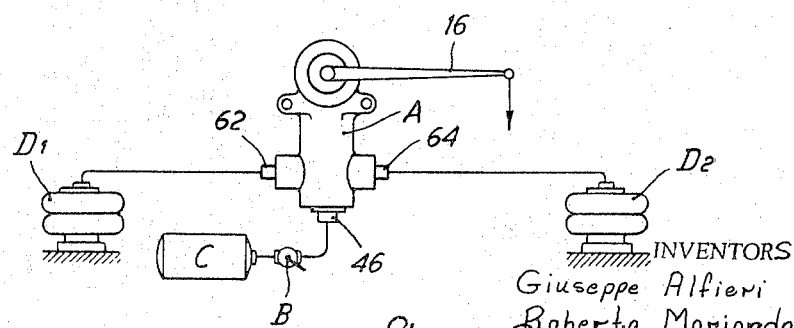
FIGURE 4 is a diagram which shows the insertion of the device in the pneumatic suspension system of a vehicle.

As shown in FIGURES 1 and 4, leveller A is a servo-actuatable self-disconnecting type. While the vehicle is running said leveller is disconnected from the pneumatic circuit by a three-way shut-off member B (see FIGURE 4). The latter connects a compressed air tank C to said leveller A and to pneumatic suspensions $D_1$ and $D_2$ of the wheels or to the left and right axles of the vehicle.

Taking FIGURE 1 into consideration, the assembly formed by the leveller and the device illustrated comprises a casing 10 having towards its upper part, bearings 12 for a pivot 14 to which an arm 16 is connected, said arm being connected to the axle, or another part of the vehicle. Unit A is secured in a known way to the frame of the vehicle. Cam 18 is keyed to pivot 14 and cooperates by means of a roller 20, with one of the ends of a hollow push rod 22 that is slideable in bushing 24 integral with casing 10.

In the lower section, said casing comprises a cylinder 26 in which a piston 28 tightly slides, said piston being axially bored so that the hollow push rod can pass through it. Piston 28 is then connected by means of a tubular piston rod 30 to a second piston 34 which slides in a cylinder 36 which is co-axial to cylinder 26.

Also piston 34 is axially bored and the bore in said piston constitutes a sealing seat 38 for a valve 40 pressed against said seat by the action of a spring 42. A cover 44 closes the lower part of cylinder 36, retains the other end of said spring 42 and at its central portion, has a fitting 46 to which a line is connected, said line extending through cock B to tank C.

The piston set 28–34 is biased by a helical spring 47 fitted on rod 30 and retained, on one hand, by the shoulder formed between cylinder 26 and chamber G intermediate to cylinders 26 and 36, and on the other hand, by a shoulder formed between rod 30 and piston 34. The action of spring 47 maintains said piston set against the cover 44 which acts as a stop. A second stop is formed by abutment 45 between cylinder 26 and bushing 24.

Piston 34, near the zone of connection with rod 30, has a peripheral groove 48 in which shaped heads 50 are housed with a limited clearance. Each of these heads is provided at one of the ends of an arm 52 integral with a disc 54 forming the movable element of a valve and which is pressed against its seat 56 by the action of a helical spring 58. These parts are housed in a hollow projection 60 which communicates with chamber G and which serves a collecting chamber. The various hollow projections 60 are formed in the outer periphery of cylinder 36 so as to form a crown of radial elements.

In the case illustrated, there are two of projections 60, this depending on the number of the pneumatic suspension sets, and of the fittings 62 and 64 for lines which connect said projections and suspensions to each other. The action of spring 58 on valves 54 is such that, besides maintaining said valves in engagement with their seats, it also maintains arms 52 radially aligned with their axes co-planar.

The arrangement of these parts, especially of the various piston-cylinder units, defines chambers, one of which, F is formed in the interior of piston 34 and is connected to tank C. A second chamber G, previously considered, communicates with both a third chamber H and suspensions $D_1$ and $D_2$, said chamber H being provided between pushrod 22 and piston rod 30, through holes 68 in said hollow rod 30.

This chamber H can be connected to chamber F when valve 40 opens, or to the atmosphere through pushrod 22 and a hole 25 at a suitable position in casing 10. Therefore, the collecting chamber G and the elemental chambers K can also be connected to either the atmosphere or tank C.

Hollow push rod 22 slides with a certain amount of friction within bushing 24 and piston 28, due to the provision of gaskets interposed between these parts. The result is that when leveller A is inoperative, push rod 22 (during the oscillations of cam 18) assumes a lower position in which the lower end of said push rod will be very near valve 40, without engaging the latter and without moving it way from its seat.

The operation of the leveller is as follows. In normal conditions, that is, when the vehicle is running, the leveller is inactive, and its parts assume the positions shown in FIGURE 1. The communications between the collecting chamber G and elemental chamber K (pneumatic suspension $D_1$ and $D_2$), and between chamber G and chamber F are thus shut off. Chamber F is connected to atmosphere through the three-way cock B. However, the communications between chamber G and H (through radial holes 68), and between said chamber H and atmosphere (through hollow push rod 22 and hole 25) are established.

The oscillations of cam 18 (which occurs while the vehicle is running because of the relative movement between the wheel axles and the vehicle frame) displace, as already set forth, the hollow pushrod 22 for a certain length so that it remains completely inoperative. The leveling of the vehicle after it is stopped as the load varies, is realized by opening cock B which interrupts communication of chamber F with atmosphere and connects said chamber to tank C.

The admission of compressed air into chamber F causes the piston set 28–34 to raise against the action of spring 47 until it is stopped against shoulder 45. During this displacement heads 50 of valves 54 are also moved upwards in a counter-clockwise direction, each of said valves being partially moved away from its seat to assume an inclined position which establishes the communication between all of chambers K and the collecting chamber G.

The displacement of piston set 28–34 can or cannot engage the end of pushrod 22 with valve 40 depending on the angular position assumed by cam 18 under the action of the vehicle load. Assuming that the vehicle load has been reduced relative to the previously considered conditions, in this case, no engagement occurs between the end of pushrod 22 and valve 40. Therefore chambers K are caused to communicate with atmosphere and an amount of air is discharged from suspensions $D_1$ and $D_2$ to thereby reduce the pressure in said suspensions. The exhaust of said air provokes a relative displacement between the frame and the wheels of the vehicle until pushrod 22 of the leveller is engaged against valve 40 to interrupt the communication between the suspensions and atmosphere.

In the case in which the load on the vehicle increases, cam 18 engages the end of pushrod 22 with valve 40 to move the latter away from its seat. The communication between chamber G and atmosphere is closed and the communication between said chamber G and chamber F is established. Therefore, compressed air is supplied to pneumatic suspension $D_1$ and $D_2$, increasing the pressure in said suspensions and said flow is interrupted depending on the displacement between the frame and the wheels of the vehicle, in connection with the increase in pressure in the pneumatic suspensions.

Upon obtaining leveling of the vehicle, the driver turns the cock again to interrupt the communication between tank C and chamber F and to connect the latter with atmosphere. The action of spring 47 displaces pistons 28–34 against cover 44 to re-set the engagement of valves 54 with their seats. The pneumatic suspensions $D_1$ and $D_2$ are separated from each other and are not affected by the dynamic actions or the like, which can act on the vehicle while it is running.

Figure 2:
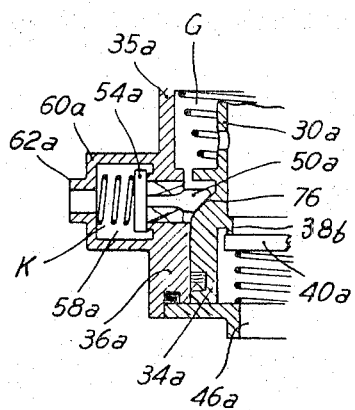
Figure 3:
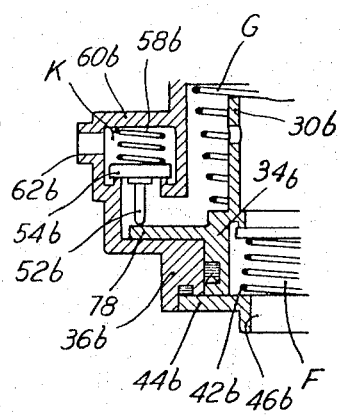

Taking into account the modifications illustrated in FIGURES 2 and 3, the like or equivalent parts are designated by the same references. In the case of FIGURE 2, piston 34a has, towards its outer end, a frusto-conical plane 76 with which the ends of shaped heads 50a of valves 54a, which control the communication between chambers K and collecting chamber G, cooperate.

In this case, the operation of the leveller and the device of this invention is similar to the preceding one except that valves 54a instead of being tilted or oscillated, are moved away in parallel completely from their seats 56a. In order to assure this displacement, said valves could have guide members.

In the modification according to FIGURE 3, valves 54b are arranged in the form of a crown with their axes parallel to the axes of pistons 34b–28b. Each of said valves has a pin 52b which is engaged with a flange 78 integral with piston 34b. Even in this modification valves 54b are completely moved away from their seats and the operation of said modification is equal to that of FIGURE 1.

Other variations and modifications could be made depending on the requirements of use. For instance, the device could be constructed as an independent element adapted to be inserted in the desired position between the leveller and the pneumatic suspensions. Cock B could be replaced by a solenoid valve to actuate the leveller automatically. The above and other variations will not depart from the scope of the invention and from the spirit thereof.

We claim:
1. A servo actuatable leveller for a vehicle, said leveller comprising a pneumatic pressure responsive suspension system for each wheel of at least one pair of wheels of the vehicle, the wheels of each pair being located on opposite sides of the vehicle; a collecting chamber adapted to be connected to a source of high pressure fluid and to a source of low pressure fluid; a passage connecting each of said suspension systems to said chamber; a shut-off valve means disposed in each of said passages and normally preventing the flow of fluid therethrough; control means to open said valve means and thereby connect said suspension systems to said chamber and to each other, said control means comprising a cylinder and a piston slidable in said cylinder to operatively engage said valve means, and means responsive to the actuation of said control means and to the height of at least a portion of said vehicle with respect to said wheels for selectively connecting said chamber to said source of high pressure fluid or to said source of low pressure fluid.

2. The leveller of claim 1, further comprising an annular groove formed in the periphery of said piston, each of said valve means including a shaped head engaged with a limited clearance in said groove.

3. The leveller of claim 1, wherein a portion of the surface of said piston is of a frusto-conical shape and wherein each of said valve means includes a shaped head cooperating with said surface.

4. The leveller of claim 1, further comprising a flange formed on said piston and a plurality of pins integral with said valve means cooperating with said flange, said pins being arranged with their axes parallel to the axis of said piston.

5. The leveller of claim 1, further comprising an actuating device to selectively actuate said control means, said actuating device including means to direct said high pressure fluid against said piston to move same in response to the force established by said fluid.

6. The leveller of claim 5, further comprising resilient means urging said piston in a direction opposite to the force established by said fluid.

References Cited

UNITED STATES PATENTS 659,619  3/1963  Davies et al. _____ 282—6.1

BENJAMIN HERSH, *Primary Examiner.*

MILTON BUCHLER, *Examiner.*

P. GOODMAN, *Assistant Examiner.*